US006944283B1

(12) United States Patent
Klein

(10) Patent No.: US 6,944,283 B1
(45) Date of Patent: *Sep. 13, 2005

(54) PROCESS FOR TRANSMITTING A TELEPHONE NUMBER OF A DESIRED SUBSCRIBER, AND DIRECTORY ENQUIRIES FACILITY TERMINAL FOR THIS PURPOSE

(75) Inventor: Johann Klein, Asperg (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,320

(22) Filed: Nov. 25, 1998

(30) Foreign Application Priority Data

Nov. 28, 1997 (DE) ................................. 197 52 838

(51) Int. Cl.⁷ .............................................. H04M 1/00
(52) U.S. Cl. ........................... 379/355.04; 379/355.02; 379/218.01; 455/566
(58) Field of Search ...................... 379/355.04, 218.01, 379/355.01, 355.02, 355.03; 455/466, 414.1, 455/414.3, 566

(56) References Cited

U.S. PATENT DOCUMENTS

| 5,483,586 | A | * | 1/1996 | Sussman | 379/355.04 |
| 5,509,049 | A | * | 4/1996 | Peterson | 379/218.01 |
| 5,543,789 | A | | 8/1996 | Behr et al. | |
| 5,764,731 | A | * | 6/1998 | Yablon | 379/355.02 |
| 5,850,433 | A | * | 12/1998 | Rondeau | 379/218.01 |
| 6,011,976 | A | * | 1/2000 | Michaels et al. | 455/466 |
| 6,608,637 | B1 | * | 8/2003 | Beaton et al. | 455/566 |

FOREIGN PATENT DOCUMENTS

| DE | 28 19 633 B1 | 11/1979 |
| DE | 33 29 267 A1 | 2/1985 |
| DE | 40 12 863 A1 | 10/1991 |
| EP | 0 458 563 A2 | 11/1991 |
| WO | WO 97/22209 A1 | 6/1977 |

OTHER PUBLICATIONS

Otto F. Schroter"Leistungen an Euro-SDN zugig anpassen", In: NET, 49/1995, H. 10, S. 16-22.
Peter Bocker, ISDN—Das diensteintegrierende digitale Nachrichtennetz, Springer-Verlag, Berlin, u.a., 1987, 2 Aufl. S-22-27.
Armand Carmine, Screenphones and ADSI: the first international communications service the fax machine . . . , In: Philips Telecommunication Review, vol. 52, No. 4, 1995, S. 25-29.

(Continued)

Primary Examiner—Jefferey F Harold
(74) Attorney, Agent, or Firm—Sughrue Mion, PLLC

(57) ABSTRACT

A process for transmitting a telephone number of a desired subscriber from a directory enquiry facility (ENQ) to a terminal (TER), a directory enquiry facility (ENQ) for this purpose, and a terminal for this purpose. The terminal (TER) is connected to the directory enquiry facility (ENQ) over a telecommunication network with a first channel (BCHAN) for voice transmission and a second channel (DCHAN) for data transmission. An enquiry with data describing the required subscriber is transferred from the terminal (TER) to the directory enquiry facility (ENQ) on the first channel (BCHAN), the telephone number is sent by the directory enquiry facility (ENQ) in the form of a numeric string on the second channel (DCHAN). The terminal (TER) receives the numeric string, derives the telephone number, and stores it in a memory (MEM) provided for direct dialling of the telephone number.

27 Claims, 1 Drawing Sheet

OTHER PUBLICATIONS

Mobile Assistenten-Fahreinformation uber das Mobilfunknetz, ELVjournal, issue 3/96, pp. 60-64.

Elektronik Literatur Verlag Journal, "Mobile Assistenten-Fahrerinformation über das Mobilfunknetz", XP-002239291, Sep. 1, 1996, pp. 60-64.

Daniel L. Frank, "Information Systems: An Integral Part of Future Vehicles", Proceedings of the Position Location and Navigation Symposium (Plans '90), Las Vegas, Mar. 20-23, 1990, pp. 52-55, XP010001096, IEEE, New York, US.

* cited by examiner

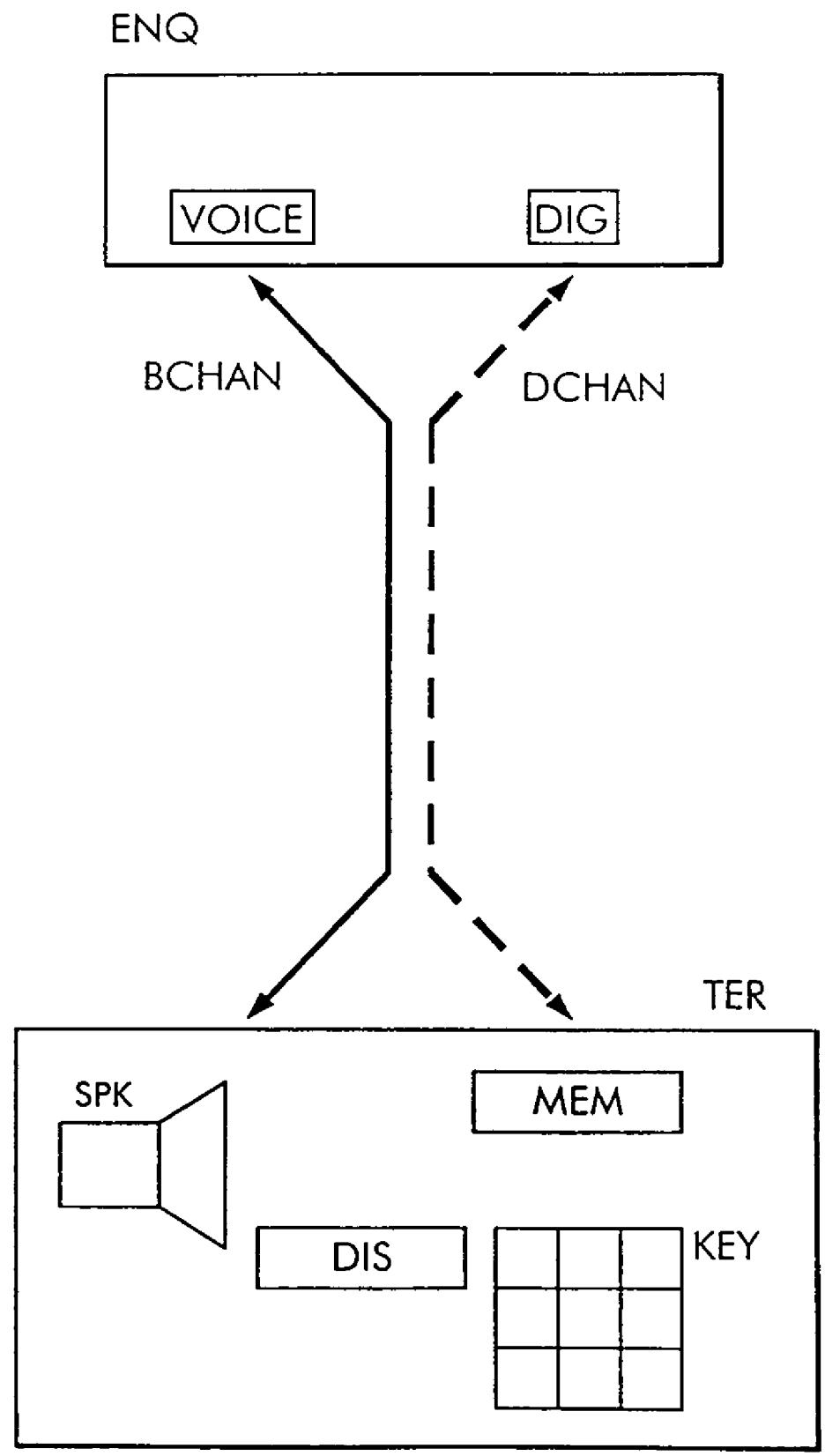

PROCESS FOR TRANSMITTING A TELEPHONE NUMBER OF A DESIRED SUBSCRIBER, AND DIRECTORY ENQUIRIES FACILITY TERMINAL FOR THIS PURPOSE

BACKGROUND OF THE INVENTION

This application is based on and claims priority from German patent application No. 197 52 838.4, which is incorporated by reference herein.

The present invention relates to a process for transmitting a telephone number of a desired subscriber from a directory enquiry facility to a terminal, a directory enquiry facility for this purpose, and a terminal for this purpose.

In addition to referring to a telephone directory in hard copy form and more recently in electronic form, the facility of using a telecommunication terminal to access a directory enquiries service is frequently used to find out the telephone number of a party the subscriber wishes to communicate with. In such an enquiry, the enquirer gives the directory enquiries service the name and address of the party they wish to contact, and the directory enquiries service then determines the telephone number and announces it. The enquirer then has to note down the telephone number, and having disconnected from directory enquiries, enter the telephone number in the terminal to telephone the party he wishes to contact. The enquirer can mis-hear the telephone number announced, or note it down wrong, or key it in wrong on the terminal, vitiating the link to the party required, and possibly having to contact directory enquiries again to get the telephone number.

On the subject of traffic telematics, an article appeared in the ELVjournal, issue 3/96 on pages 60–64 entitled "Mobile Assistenten-Fahrerinformation über das Mobilfunknetz" ["Mobile Assistant Driver Information over the Mobile Phone Network"], and page 61 describes an on-board computer with display and terminal capable of providing current traffic information interacting with a D2 mobile telephone network terminal, that also provides an easy means of relaying a breakdown call to a service center. In a way not described in further detail in the article referred to, it is also possible to use this on-board computer to access the address of a possible communication partner including that partner's telephone number from the service center, and to display this information on the on-board computer. The telephone connection can then be made by "simply pressing a button". The on-board computer cooperates with the mobile telephone unit in a similar way as with a CSTA system (CSTA= Computer Aided Telephony Application), with the functions of the mobile telephone unit being complemented by the functions of the on-board computer in a convenient manner.

A mobile phone is, however, not usually used together with an on-board computer, either because there is none available (the article referred to relates to a major trial) or because the mobile phone is being used away from a vehicle. The above facilities are then no longer available, and the opportunities for error referred to above in hearing the telephone number, noting it down, and entering it into a telephone terminal arise again. Communication with a directory enquiry service when using a land line telephone terminal is similarly inconvenient and prone to error.

SUMMARY OF THE INVENTION

The function of the invention is to make the telephone number provided by the directory enquiries service conveniently available at a telecommunications terminal.

This task is carried out by a process according to the technical principle of claim 1, a directory enquiries facility according to the technical principle in claim 8, and a terminal according to the technical principle in claim 10. Further advantageous variants of the invention are given in the dependant claims and the description.

BRIEF DESCRIPTION OF THE DRAWING

The invention will be more clearly undersstood from the following description in conjunction with the accompanying drawing, wherein the single FIGURE shows an example of an arrangement a directory enquiry facility and terminal according to the present invention, connected to each other by the channels BCHAN and DCHAN.

DETAILED DESCRIPTION OF THE INVENTION

The FIGURE shows an arrangement with which the process based on the object of the invention can be used. A directory enquiry facility ENQ is connected to a terminal TER by a channel BCHAN for transmitting voice and a channel DCHAN for transmitting data. Channel BCHAN can for example be a B channel in an ISDN line, the channel DCHAN can be a D channel or another B channel in the same ISDN line. But it is also possible for there to be an analogue voice connection with a channel BCHAN for voice between the directory enquiries facility ENQ and the terminal TER, and the channel DCHAN to be an in-band signalling channel on which information can be transmitted e.g. with the assistance of DTMF signals (DTMF—dual tone multi frequency).

If a user of the terminal TER now wants to find out a phone number, he will, as accustomed, initially telephone the directory enquiry facility ENQ. The terminal TER then has a voice connection over the channel BCHAN to the voice facility VOICE for voice input and voice output on the directory enquiry facility ENQ. The voice facility VOICE can in the simplest case consist of a microphone and a loudspeaker, or a module for automatic voice recognition and one module for electronic voice generation. The user gives the name and address of the party with whom he wishes to communicate to the directory enquiry facility ENQ over the BCHAN, whereupon the telephone number is determined. The voice facility VOICE then sends a voice message with the desired telephone number over the channel BCHAN which is then output to the loudspeaker SPK in the terminal TER.

In addition to or instead of voice transmission of the desired telephone number, the module DIG generates a numeric string from the telephone number determined at the directory enquiry facility ENQ, and this string is sent by the directory enquiry facility ENQ to the terminal TER on the channel DCHAN. In contrast to a digitalized voice information in which the telephone number can be sent on the channel BCHAN, e.g. if the channel BCHAN is a B channel of an ISDN line, then here and in the text below the term "numeric string" is to be understood and used as a synonym for representation of the telephone number that is not necessarily in voice form. Also the representation of the telephone number with the help of the DTMF signals referred to can be understood as a numeric string, since each digit of the subscriber number is allocated its own frequencies. The terminal TER converts the telephone number from the numeric string into a format used within the terminal TER, so that the subscriber number can be stored in the memory MEM of the terminal TER. The numeric string can for example be sent on the channel BCHAN in the context of a User-to-User Signal, as provided for in the DSS1 protocol for ISDN telecommunication networks as a feature called "customer-specific signalling information during a connection", abbreviated to "UUS3". When the numeric string has been transmitted with the aid of user-to-user signalling, the terminal TER must determine the numeric string from the signal message before the telephone number is converted into an internal format and stored. A special form of signalling can, however, also be determined between the directory enquiries facility ENQ and the terminal TER for transmitting the telephone number, e.g. by defining such a message within the framework of the DSS1 protocol.

A further alternative is for the telephone number to be transmitted from the directory enquiry facility ENQ to the terminal TER in the form of a CLI message (CLI= Calling Line Identification). A CLI message can be transmitted both in an ISDN telecommunication network on a DCHAN and also in an analogue telecommunications network in the form of in-band signalling. A CLI message is by definition provided for informing the party being called of the number of the incoming call. Therefore it is normal practice to check by devices in the telecommunication network, e.g. from a local exchange serving the terminal TER (not shown in the FIGURE), whether the CLI message transmitted by a caller coincides with that caller's telephone number. Only then is the CLI message transferred to the party being called. If this check is however switched off for calls to the directory enquiries facility ENQ, the directory enquiry facility ENQ can also send a CLI message to the terminal TER containing a telephone number determined by the directory enquiry facility ENQ instead of the telephone number of the directory enquiry facility ENQ.

The telephone number can be relayed from the memory MEM and displayed on a display DIS in the terminal TER, so that it can be conveniently read off and noted by the user. When the call has been terminated, the user can also use the telephone number to dial the required party. The user then does not have to enter the telephone number into the terminal TER himself, but just presses a key on the keyboard KEY, e.g. the Repeat key, thus causing the terminal TER to use the stored telephone number directly as dialling information. The terminal TER can however also start dialling the required telephone number automatically when the call to the directory enquiry facility ENQ has terminated, without any key on the keypad being pressed.

Rapid transmission of the telephone number in the form of a numeric string enables the call between the directory enquiry facility ENQ and the terminal TER to be activated sooner than where the telephone number has to be dictated by voice and noted down by the user. This increases the availability of the directory enquiry facility ENQ, and reduces the cost to the user for occupying the line to the directory enquiry facility ENQ. On the other hand, parallel use of the two channels BCHAN and DCHAN makes it possible to communicate with the directory enquiry facility ENQ from the terminal TER both in conventional voice form and in convenient, fast numeric form.

For every call to the directory enquiry facility ENQ, the telephone number can be transmitted in the form of a numeric string from the directory enquiry facility ENQ to a terminal TER automatically, without any action by the user. It is however also possible for the user to give verbal instructions on the channel BCHAN, or for the terminal TER to send a message to the directory enquiry facility ENQ when a key on the keypad KEY is pressed, e.g. also as user-to-user signalling on the channel DCHAN, instructing the directory enquiry facility ENQ to transmit the telephone numerically.

Fast and efficient transmission of the telephone number also enables several telephone numbers to be extracted in one call to the directory enquiry facility ENQ, e.g. by the user giving the data of several parties he wishes to communicate with, and the directory enquiry facility ENQ then sending a series of telephone numbers in numeric form. There could however also be interaction between the terminal TER and the directory enquiry facility ENQ in which the user presses a key on the keypad KEY after receipt of a telephone number to instruct the terminal TER to send a message to the directory enquiry facility ENQ, signalling to the directory enquiry facility ENQ a request for further information. Then the user of the terminal TER can request another telephone number on the channel BCHAN from the directory enquiry facility ENQ.

The terminal TER can both interpret the numeric string in the autonomous manner described and enter the required telephone number in the memory MEM, and also be caused to do so by the directory enquiry facility ENQ. In this case the directory enquiry facility ENQ can for example send a signal before sending the telephone number in the form of a numeric string, causing the terminal TER to switch to Receive mode for the telephone number that follows. But the numeric string and then a signal can, however, also be sent first, causing the numeric string to be interpreted in the terminal TER. Such a signal can also conveniently be transmitted on the channel DCHAN just like the numeric string, and could also for example be a message from the DSS1 protocol for ISDN telecommunication networks.

It is also possible for the user to press a key on the keypad KEY, and the terminal TER to then determine the telephone number from a numeric string already received from the directory enquiry facility ENQ and temporarily stored, and store it in the memory MEM.

In addition to the telephone, the module DIG in the directory enquiry facility ENQ can also send the name and address of the desired communication partner as an alphanumeric string to the terminal TER, so that this terminal can also display the name and address as well as the telephone number. The user can thus easily check whether his information regarding the party he wishes to communicate with was correctly understood at the directory enquiry facility ENQ. Also the telephone number can then be stored permanently in a way that it can be easily found in the terminal TER with the aid of the data of the communication partner, e.g. made available as an abbreviated dialling number or entered in a so-called personal telephone book in which the user stores data on possible communication partners.

If the terminal TER is a mobile telephone, e.g. suitable for the D2 mobile telephone network mentioned above, a voice channel of a link between the terminal TER and the directory enquiry facility ENQ on the D2 mobile radio network can be used for the channel BCHAN, and an organization channel for the channel DCHAN. In such an organization channel, a telephone number requested can be transmitted from the directory enquiry facility ENQ to the terminal TER e.g. with the aid of an SMS message (Short Message Service).

What is claimed is:

1. A process of transmitting a telephone number of a desired subscriber from a directory enquiry facility to a terminal connected to the directory enquiry facility over a telecommunication network with a first channel for voice transmission and a second channel for data transmission, said process comprising:
   transmitting an enquiry with the data describing the desired subscriber from the terminal to the directory enquiry facility on the first channel;
   transmitting the telephone number in the form of a numeric string from the directory enquiry facility to the terminal on the second channel;
   receiving the numeric string at the terminal;
   determining the telephone number from the numeric string; and
   storing the telephone number in a memory in the terminal provided for direct dialing of telephone numbers,
   wherein the terminal sends a message to the directory enquiry facility on the second channel indicating to the directory enquiry facility a request for further information.

2. The process according to claim 1, whereby the directory enquiry facility also issues an action command that causes the terminal to determine the telephone number from the numeric string and to save the telephone number in the memory in the terminal provided for direct dialing of telephone numbers.

3. The process according to claim 1, whereby the telephone number is displayed on a display in the terminal.

4. The process according to claim 1, whereby the directory enquiry facility sends the data describing the desired subscriber as an alpha-numeric string to the terminal on the second channel, and the terminal receives the alpha-numeric string, derives the data from the alpha-numeric string, and displays it on a display.

5. The process according to claim 1, wherein the telecommunication network comprises an ISDN network and the second channel is a D channel of the ISDN network.

6. The process according to claim 1, wherein the first channel and the second channel are configured to transmit signals at substantially the same time.

7. The process according to claim 1, wherein the first channel for voice transmission and the second channel for data transmission are configured to transmit signals during a single telephone call.

8. The process according to claim 1, wherein the telecommunication network comprises a GSM mobile telephone network and the second channel is an organization channel of the mobile telephone network.

9. The process according to claim 1, wherein the first channel is configured for use with the second channel during a single telephone call.

10. The process according to claim 1, wherein the terminal includes an input device, and the terminal sends the message to the directory enquiry facility on the second channel indicating to the directory enquiry facility a request for further information when an input is received by the input device of the terminal.

11. The process according to claim 1, wherein the telecommunications network comprises an analog network, and wherein the second channel is an in-band signaling channel.

12. A process of transmitting a telephone number of a desired subscriber from a directory enquiry facility to a terminal connected to the directory enquiry facility over a telecommunication network with a first channel for voice transmission and a second channel for data transmission, said process comprising:
   transmitting an enquiry with the data describing the desired subscriber from the terminal to the directory enquiry facility on the first channel;
   transmitting the telephone number in the form of a numeric string from the directory enquiry facility to the terminal on the second channel;
   receiving the numeric string at the terminal;
   determining the telephone number from the numeric string; and
   storing the telephone number in a memory in the terminal provided for direct dialing of telephone numbers,
   wherein said terminal includes a keyboard, and the terminal sends a message to the directory enquiry facility on the second channel when a key is pressed on the keyboard of the terminal, indicating to the directory enquiry facility a request for further information.

13. The process according to claim 12, where the telecommunication network is an ISDN network and the second channel is a D channel of the ISDN network.

14. A directory enquiry facility comprising:
   receiver means for connecting to a terminal over a telecommunication network on a line with a first channel for voice transmission and a second channel for data transmission, and receiving on the first channel an enquiry with data describing a desired subscriber, and receiving on the second channel a message sent by the terminal indicating to the directory enquiry facility a request for further information;
   converter means for converting a telephone number into a numeric string; and
   transmitter means for transmitting the numeric string to the terminal on the second channel.

15. A directory enquiry facility according to claim 14, wherein the facility further comprises means for issuing an action command which causes the terminal to determine the telephone number from the numeric string and store that telephone number in a memory of the terminal provided for direct dialing of the telephone number.

16. The directory enquiry facility according to claim 14, wherein the telecommunication network comprises a GSM mobile telephone network and the second channel is an organization channel of the mobile telephone network.

17. The directory enquiry facility according to claim 14, wherein the first channel is configured for use with the second channel during a single telephone call.

18. A terminal for a telecommunication network, the terminal comprising:
   means for connecting over the telecommunication network to a directory enquiry facility on a line with a first channel for voice transmission and a second channel for data transmission;
   means for transmitting on the first channel for voice transmission an enquiry with data describing a desired subscriber;
   means for receiving on the second channel a telephone number of a subscriber sent from the directory enquiry facility in the form of a numeric string;
   means for determining the telephone number from the numeric string; and
   memory means for storing the telephone number and for yielding the telephone number for direct dialing of the subscriber,
   wherein said terminal includes a keyboard, and the terminal sends a message to the directory enquiry facility on the second channel when a key is pressed on the keyboard of the terminal, indicating to the directory enquiry facility a request for further information.

19. A directory enquiry telephone number transmission system, comprising:

means for transmitting an enquiry with data describing a desired subscriber from a terminal to a directory enquiry facility on a first channel for voice transmission;

means for transmitting a telephone number in the form of a numeric string from the directory enquiry facility to the terminal on a second channel for data transmission;

means for receiving the numeric string at the terminal;

means for issuing an action command by the directory enquiry facility to cause the terminal to determine the telephone number from the numeric string and to save the telephone number in the memory in the terminal provided for direct dialing of telephone numbers, wherein said terminal includes a keyboard, and the terminal sends a message to the directory enquiry facility on the second channel when a key is pressed on the keyboard of the terminal, indicating to the directory enquiry facility a request for further information.

20. A directory enquiry facility comprising:

a receiving module configured to receive from a terminal connected to a telecommunication network, with a line with a first channel for voice transmission and a second channel for data transmission, an enquiry with data describing a desired subscriber, the receiving module receiving the enquiry on the first channel;

a converter configured to convert a telephone number into a numeric string; and a transmitter configured to transmit the numeric string to the terminal on the second channel, wherein the receiving module is configured to receive on the second channel a message sent by the terminal indicating to the directory enquiry facility a request for further information.

21. The directory enquiry facility of claim 20, wherein the facility is configured to issue an action command to cause the terminal to determine the telephone number from the numeric string and to store the telephone number in a memory of the terminal provided for direct dialing of the telephone number.

22. The directory enquiry facility according to claim 20, wherein the telecommunication network comprises a GSM mobile telephone network and the second channel is an organization channel of the mobile telephone network.

23. The directory enquiry facility according to claim 20, wherein the first channel is configured for use with the second channel during a single telephone call.

24. A terminal in a telecommunication network comprising:

a connecting module configured to connect over the telecommunication network to a directory enquiry facility on a line with a first channel for voice transmission and a second channel for data transmission, and to transmit on the first channel an enquiry with data describing a desired subscriber;

a receiving module configured to receive on the second channel a telephone number of a subscriber sent from the directory enquiry facility in the form of a numeric string and to determine the telephone number from the numeric string; and a memory configured to store the telephone number and to yield the telephone number for direct dialing of the subscriber, wherein the connecting module is configured to send a message to the directory enquiry facility on the second channel indicating to the directory enquiry facility a request for further information.

25. The terminal according to claim 24, wherein the telecommunication network comprises a GSM mobile telephone network and the second channel is an organization channel of the mobile telephone network.

26. The terminal according to claim 24, wherein the first channel is configured for use with the second channel during a single telephone call.

27. The terminal according to claim 24, further comprising a keyboard, wherein the connecting module is configured to send a message to the directory enquiry facility on the second channel indicating to the directory enquiry facility a request for further information when a key is pressed on the keyboard of the terminal.

* * * * *